(12) United States Patent
Tropf

(10) Patent No.: US 7,321,890 B2
(45) Date of Patent: Jan. 22, 2008

(54) DATABASE AND METHOD FOR ORGANIZING DATA ELEMENTS

(76) Inventor: Hermann Tropf, Blumenstrasse 5, St. Leon-Rot (DE) D-68789

( * ) Notice: Subject to any disclaimer, the term of this patent is extended or adjusted under 35 U.S.C. 154(b) by 392 days.

(21) Appl. No.: 10/781,488

(22) Filed: Feb. 18, 2004

(65) Prior Publication Data

US 2004/0177065 A1    Sep. 9, 2004

(51) Int. Cl.
*G06F 7/00* (2006.01)
*G06F 17/30* (2006.01)
*G06F 17/00* (2006.01)

(52) U.S. Cl. ............................ 707/3; 707/5; 707/102
(58) Field of Classification Search .................. 707/1, 707/7, 100, 102, 3–6; 382/297
See application file for complete search history.

(56) References Cited

U.S. PATENT DOCUMENTS

| | | | | |
|---|---|---|---|---|
| 4,837,845 | A * | 6/1989 | Pruett et al. ................. | 382/297 |
| 6,154,746 | A * | 11/2000 | Berchtold et al. .......... | 707/100 |
| 6,460,026 | B1 * | 10/2002 | Pasumansky ................ | 707/1 |
| 6,510,435 | B2 | 1/2003 | Bayer | |
| 2002/0095412 | A1 * | 7/2002 | Lee et al. ..................... | 707/7 |
| 2003/0004938 | A1 | 1/2003 | Lawder | |
| 2003/0187867 | A1 * | 10/2003 | Smartt .......................... | 707/102 |

FOREIGN PATENT DOCUMENTS

DE    196 35 429 A1    3/1998

OTHER PUBLICATIONS

Jagadish, H V "Linear clustering of objects with multiple attributes", 1990, ACM Press, "Proceedings of the 1990 ACM SIGMOD International Conference on Management of Data".*

J.K. Lawder. "Using State Diagrams for Hilbert Curve Mappings". Technical Report JL2/00, Birkbeck College, University of London, 2000.*

Bially, T. "Space-Filling Curves: Their generation and their application to bandwidth reduction". Information Theory, IEEE Transactions on, Nov. 1969. vol. 15, Issue 6. pp. 658-664.*

Xian Liu, et al. "An Algorithm for encoding and decoding the 3-D Hilbert Order". Sep. 1997, IEEE Transactions on Image Processing, vol. 6, Issue 9, pp. 1333-1337.*

Tropf, et al., "Multidimensional Range Search in Dynamically Balanced Trees." Angewandte Informatik, Feb. 1981, pp. 71-77, Wiesbaden, Germany.

Orenstein, "Spatial Query Processing in an Object-Oriented Database System." ACM SIGMOD Intnl. Conf. on Management of Data, 1986, pp. 326-336, vol. 15, No. 2.

(Continued)

*Primary Examiner*—Charles Rones
*Assistant Examiner*—Charles D Adams
(74) *Attorney, Agent, or Firm*—IP Strategies

(57) ABSTRACT

A database system and method for organizing data elements according to a Hilbert curve, said data elements being representable by a plurality of coordinates, said database system comprising:

first means for generating a plurality of bitblocks by bitwise interleaving the coordinates of the data elements;

second means for applying a fliprot transformation to a first bitblock;

said fliprot transformation comprising a flip transformation and a rot transformation, said flip transformation inverting bits of said bitblock, said rot transformation interchanging bits of said bitblock;

third means for obtaining, for each further bitblock, a fliprot transformation by a concatenation of two or more fliprot transformations; and fourth means for applying fliprot transformations to their corresponding bitblock;

whereby the bitblock bits determine the organization of said data elements according to said Hilbert curve.

19 Claims, 5 Drawing Sheets

OTHER PUBLICATIONS

Markl, "MISTRAL: Processing Relational Queries Using a Multi-dimensional Access Technique." Doctoral Thesis, Techn. Univ. Munich, 1999, Germany.

Faloutsos, "Multiattribute Hashing Using Gray Codes." ACM SIGMOD Intnl. Conf. on Management of Data, 1986, pp. 227-238, vol. 15, No. 2.

Lawder, et al., "Querying Multi-Dimensional Data Indexed Using the Hilbert Space-Filling Curve." ACM SIGMOD Record, 2001, pp. 19-24, vol. 3, No. 1.

Lawder, "Calculation of Mappings Between One and n-Dimensional Values Using the Hilbert Space-Filling Curve." Technical Report No. JL1/00, Aug. 15, 2000, pp. 1-13, www.Citeseer.com, accessed Jul. 8, 2003.

Butz, "Alternative Algorithm for Hilbert's Space-Filling Curve." IEEE Transactions on Computers, Apr. 1971, pp. 424-426, vol. 20.

"Literature Collection of Tree Index." www.comp.nus.edu.sg/~liaojiro/tree.htm, accessed Apr. 6, 2004.

Gaede, et al., "Multidimensional Access Methods." ACM Computing Surveys, Jun. 1998, pp. 170-231, vol. 30, No. 2.

Ramsak, et al., "Integrating the UB-Tree into a Database System Kernel." Proc. of the 26th Intnl. Conf. on Very Large Databases, 2000, pp. 263-272, Cairo, Egypt.

\* cited by examiner

|     | x= | 0  | 1  | 2    | 3   | 4  | 5  | 6  | 7  |
|-----|----|----|----|------|-----|----|----|----|----|
| y=  | 0  | 0  | 1  | 4    | 5   | 16 | 17 | 20 | 21 |
| y=  | 1  | 2  | 3  | 6    | 7   | 18 | 19 | 22 | 23 |
| y=  | 2  | 8  | 9  | (12  | 13) | 24 | 25 | 28 | 29 |
| y=  | 3  | 10 | 11 | (14  | 15) | 26 | 27 | 30 | 31 |
| y=  | 4  | 32 | 33 | (36  | 37) | 48 | 49 | 52 | 53 |
| y=  | 5  | 34 | 35 | (38  | 39) | 50 | 51 | 54 | 55 |
| y=  | 6  | 40 | 41 | 44   | 45  | 56 | 57 | 60 | 61 |
| y=  | 7  | 42 | 43 | 46   | 47  | 58 | 59 | 62 | 63 |

```
Expl.1  Expl.2:  Expl.3:  Expl.4:  Expl.5:

```
     zyx         zyx    Tab(0)=(000/+2)
 0||000(a) ||000(a)    000  (a)
     000       . .      010
     000       . .      110
     000       . .      100
     000       . . >>   101                          (c): see text
     000       . .      111
     000       . .      011
     000       ..1(b)   001
-------------------------------------
1    001       .0.(b)
     001       ...                                   (b): x bit changing in opposite
way
     ...       ...
     001       .1.(b)
-------------------------------------
2    011       .0.(b)
     ...       ...
     011       ..0(b)
-------------------------------------
3    010       ..1(b)   011  Tab(3)=(011/0)
     ...       ...      ...
                   >>        000 XOR 011=011
                             100 XOR 011=111
     010       1..(b)   111
-------------------------------------
4    110       0..(b)
               ...
     110       ..1(b)
-------------------------------------
5    111       ..0(b)
     ...       ...
     111       .0.(b)
-------------------------------------
6              Tab(6)=(110/+1)
     101       .1.(b)   0  ||110(a)     110(a)
                                110       ...
                                ...
     101                 1      010
     101                 2      011
                                Sub-Sub-Cube:
                         ConcatTab(3)=(011/0) with
                         Tab(6)=(110/+1)
     101                 3      111       011
                         3      111       010
                         3      111       000
                         3      111       001
                         3      111       101
                         3      111       100
                         3      111       110
                         3      111       111
     101                 4      101
     101                 5      001
     101                 6      000
     101       ..0(b)    7  ||100(a)      100 (a)
-------------------------------------
7    100       ..1(b)                                (a): main
entry/exit                                           bitblocks
identical
 ||100    ||100(a)
```

Fig. 5

```
Primitive 1D, 2 bit, Data Cube:
   1st bit:   0------->1
   2nd bit:   0-->1-->0-->1 z   z      yz    yz        yz    yz        xyz    xyz
0   0      00    00        00    00        000    000
    1            01              01               001
1   0      01    00        01    00        001    000
    1            >01<            >10<             010
          ------------------------------------------
           11   >11<        11   >00<       011    000
                 10               10               010
           10    11         10    11       010    011
                 10               10              >111<
                                            ==========
                                            110   >011<
                                                   111
                                            111    110
                                                   100
                                            ---------------
                                            101    110
                                                   100
                                            100    101
                                                   100

DATABASE AND METHOD FOR ORGANIZING DATA ELEMENTS

FIELD OF THE INVENTION

The present invention relates to a database system and to a method for organizing multidimensional data according to a Hilbert curve.

Organizing multidimensional data in an efficient way is crucial for large databases. In particular, the number of accesses for retrieving elements in a database is to be minimized when searching within multidimensional subspaces. Searching point data in hyper rectangles is called multidimensional range search. Multidimensional range search does not only apply to geometrical data, it applies to any multikey data where at least part of the keys can be monotonically ordered. In a customer database, for example, all customers with age between 20 and 40 and Postal Code between 1000 and 2000 and income between 3000 and 5000 and name between "A . . . " and "H . . . " may be searched (names can be associated monotonically with integers in this case). Those searches are difficult to be done quickly in large databases, as conventional indexing according to one selected key and binary or tree searching according to this key results in many hits to be postprocessed. Multidimensional range search is also a basic function to perform nearest neighbour or similarity searches. It is also important in other areas like pattern recognition. Searching in non-hyper-rectangular spaces can often be coped with by approximating them by a bounding set of hyper rectangles (so only little postprocessing is needed). It has been shown that data hierarchies can be modeled, using clustering, the way that they can be efficiently handles using multidimensional range queries.

BACKGROUND OF THE INVENTION

Prior art Databases for multidimensional access may be roughly categorized into two different approaches:

A) Mapping multi dimensions onto one dimension using a space filling curve and sorting the records according to the one dimensional index. H. Tropf, H. Herzog: "Multidimensional Range Search in Dynamically Balanced Trees", Agewandte Informatik 2/1981, pp. 71-77, downloadable via www.vision-tools.com/h-tropf (in the following referenced by [1]). J. A. Orenstein: "Spatial Query Processing in an Object Oriented Database System", ACM SIGMOD Int. Conf. on Management of Data. 1986. pp. 326-336 (in the following referenced by [2]), and DE 196 35 429 (in the following referenced by [3]) with subsequent V. Markl: MISTRAL: "Processing Relational Queries using a Multidimensional Access Technique", Doctoral thesis, Techn. Univ. Munich, Germany. Infix Verlag, Sankt Augustin, Germany, 1999 (in the following referenced by [4]), and V. Markl, F. Ramsak: "Universalschlüssel: Datenbanksysteme in mehreren Dimensionen", c't 1/2001 pp. 174-179. Heise Verlag, Hannover, Germany (in the following referenced by [5]): [1] through [5] rely on Z-ordering (also called Morton ordering) which is simply realized by bitwise interleaving the keys. C. Faloutsos: "Multiattribute Hashing Using Gray Codes", Proc. of the ACM SIGMOD 1986 Int. Conference on Management of Data. pp 227-238. (in the following referenced by [6]) works on Gray coded blocks of bit interleaved data. J. K. Lawder, P. J. K. King: "Querying Multidimensional Data Indexed Using the Hilbert Space filling Curve", SIGMOD Record vol. 03 No. 1, 2001, pp. 19-24 (in the following referenced by [7]) and US patent application 2003/0004938 A1 (in the following referenced by [8]) works on Hilbert ordered data. J. K. Lawder: "Calculation of mappings between one and n-dimensional values using the Hilbert Space filling curve", Technical Report, [Online] no. JL1/00, 15. August 2000, pages 1-13, London, Retrieved from the Internet: URL: http://www.Citeseer.com [retrieved on 2003-08-07] describes a mapping algorithm from one dimensional Hilbert value to n dimensions, and vice versa, an improvement of earlier, difficult to understand work by Butz (A. R. Butz: Alternative Algorithm for Hilbert's space filling curve. IEEE Trans. On Computers, 20:424-42, April 1971), without addressing database searching.

B) Many special structures for multidimensional data have been devised, most of them are descendants of Kd-trees or R-trees, see http://www.comp.nus.edu.sg/~liaojiro/tree-.htm (in the following referenced by [9]) for a bibliography of 36 different tree types, H. Samet: "The Design and Analysis of Spatial Data Structures", Addison-Wesley 1989 (in the following referenced by [10]) or V. Gaede, O. Guenther: "Multidimensional Access Methods", ACM Computing Surveys, Vol. 30 No. 2, June 1998. pp. 170-231. (in the following referenced by [11]) for discussion.

The big advantage of A) over B) is that any tree balancing mechanism can be used to efficiently handling dynamic data, hence also B-type trees which are widely used in commercial databases. This is due to the fact that the mapping is independent of one-dimensional data structuring.

For mapping multidimensional data to one dimension in search trees, Z-ordering has first been proposed by the applicant in [1]. FIG. 1a shows an example of Z-indexing in 2D with values x=0 . . . 7, y=0 . . . 7; Interlacing the coordinate values yields the Z-Values as shown. Following these values in ascending order is a recursively Z-shaped curve.

The idea behind it is clustering: neighbouring points in multidimensions should also be neighbouring in Z-order, as much as possible. For z-ordered data, insertion, deletion and exact search are done as usual, with logarithmic complexity. Range searches with small hypercube ranges have experimentally shown to be done in logarithmic expected time [1].

Z-ordering is one of the few spatial access methods that has found its way into commercial database products ([11] section 4.3), for example now in use by the e-plus mobile communication network in order to dynamically evaluate connections after geographical and other criteria; Transaction Software GmbH, Munich, Germany, www.transaction.de.

FIG. 2 shows the recursive U-form of Hilbert ordered data for a 2D example. It seems clear from intuition and has been supported by theoretical studies that the clustering behaviour of Hilbert ordering is better than that of Z-ordering (see, e.g. citations in [7]); However, the efficient [1] solution to the key problem of finding, from a point F encountered in the database, the next one in a multidimensional query rectangle, has been suspected [4] and reported [7] to be complicated to be applied to Hilbert ordering.

The invention relies on the [1] approach to solve this key problem. Alternatives:

To do range searching in Z-data, [2] decomposes the query hyper rectangle into a sequence of elements each with consecutive Z-values, in order to do an optimized merging of the sequence with the sorted data. The sequence can be very large as there are many (possibly very small) Z-value holes in the rectangle. We did not consider it for Hilbert indexing as even for Z-indexing it compares infavorably with the earlier BIGMIN calculation approach [1]. When used with B*-trees, Bayer terms "UB-trees" (Universal B-trees). Bayer [3] proposed a procedure to do the job which turns out to be exponential with the number of dimensions ([4] p. 123). In course of the European MISTRAL project http://mistral.in.tum.de, this "critical part of the algorithm" has been replaced by a linear "bit oriented algorithm" not described in detail ([4] p. 124). The method described in F. Ramsak, V. Markl, R. Fenk, M. Zirkel, K. Elhardt, R. Bayer: "Integrating te UB-Tree into a Database System Kernel", Int. Conf. con Very Large Databases, 2000, pp263-272, turns out to be the approach already described in [1].

BRIEF SUMMARY

Therefore, it is an object of the present invention to provide a database system and a method for organizing multidimensional data according to a Hilbert curve which allows shorter access times to data being stored in the database system.

This object is achieved by a database system and method according to the independent claims. Further embodiments are defined in the dependent claims.

According to the invention, a database system is provided for organizing data elements according to a Hilbert curve, said data elements being representable by a plurality of coordinates, said database system comprising:

first means for generating a plurality of bitblocks by bitwise interleaving the components of the data elements;

second means for applying a fliprot transformation to a first bitblock;

said fliprot transformation comprising a flip transformation and a rot transformation, said flip transformation inverting bits of said bitblock, said rot transformation interchanging bits of said bitblock;

third means for obtaining, for each further bitblock, a fliprot transformation by a concatenation of two or more fliprot transformations; and fourth means for applying each fliprot transformation to its corresponding bitblock;

whereby the bitblock bits determine the organization of said data elements according to said Hilbert curve.

In a special aspect, said rot transformation indicates cyclically shifts the bits of said bitblock.

In a further special aspect, organizing comprises at least one of searching, sorting, storing, retrieving, inserting, deleting, querying, range querying, data elements in said database system.

Yet further, said organization comprises sorting said data elements into a binary tree or into a B-type tree.

According to the invention, the method of organizing data elements of a database according to a Hilbert curve, said data elements being representable by a plurality of coordinates, comprising the following steps:

generating a plurality of bitblocks by bitwise interleaving the coordinates of the data elements;

whereby a predetermined fliprot transformation is applied to a first bitblock;

said fliprot transformation comprising a flip transformation and a rot transformation, said flip transformation inverting bits of said bitblock, said rot transformation interchanging bits of said bitblock;

for each further bitblock, a fliprot transformation is obtained by a concatenation of two or more fliprot transformations;

and each fliprot transformation is applied to its corresponding bitblock;

whereby the bitblock bits determine the organization of said data elements according to said Hilbert curve.

In a further aspect, the inventive method can be used for range querying data elements in said database, with a BIGMIN calculation including a candidate calculation wherein said candidate is kept in form of rectangle data.

The invention comprises also a computer-readable data storage medium for storing program code for executing, when being loaded into a computer, according to the inventive method.

Thus, an algorithm is presented to solve the key problem of finding in Hilbert ordered data, from a point F encountered in the database, the next one in a multidimensional query rectangle, with advantage over the Lawder [7,8] algorithm. It is linear with the number of dimensions and linear with the coordinate's values word length. The method is generic in the sense that it can be switched from Hilbert indexing to alternative hierarchical indexing schemes by just changing two statements in the kernel algorithm (Z-indexing being the simplest case). As a side-product, a tiny algorithm for calculating the n-dimensional Hilbert index is presented and explained the way it can easily be modified to comply with the requirements of different applications (such as image or image sequence compression).

BRIEF DESCRIPTION OF THE DRAWINGS

The invention is described in more detail with reference to the drawings, wherein:

FIG. 4 displays Gray Code examples;

FIG. 5 displays an example for a flip rot transform in 3D; and

FIG. 6 serves for explanation for calculating the standard solution.

DETAILED DESCRIPTION OF THE INVENTION

Figure 1A:
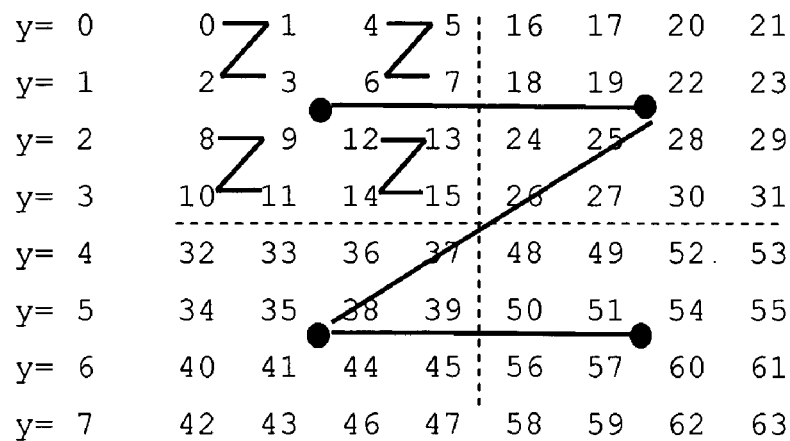
FIG. 1a shows an example of Z-indexing in 2D with values x=0 . . . 7, y=0 . . . 7.

At first, the key problem mentioned above is explained by means of the known approach with Z-indexing, Then its solution to Hilbert Indexing is described; we refer to it as BIGMIN problem in the following.

1: BIGMIN: Next Index Point in Query Rectangle

Regardless what data balancing mechanism is used (binary, B-type or other), regardless what indexing scheme is used, multidimensional range searching ends up in the problem of efficiently finding, from a point F encountered in the database (not being in the query rectangle), the next one (according to indexing scheme) which is in a multidimensional query rectangle. Stated otherwise, it is the rectangle point with minimum index bigger than the index of F; it is called BIGMIN in the following.

When searching is done in left-right manner, BIGMIN is the only thing needed. If searching is done top-down, as usual with search trees, it is helpful to calculate also the opposite thing, the rectangle point with maximum index, smaller than the index of F. This point is called LITMAX in the following.

At first sight, bit interleaving seems to have substantial difficulties when the query range overlaps the "strong" borderlines with large Z-value value jumps. In the FIG. 1b example, the range being queried (x=2 . . . 3, y=2 . . . 5) is indicated by brackets. Its lowest Z-value (12) is called MIN, its highest Z-value (39) is called MAX. If, in the course of searching a database sorted after Z-values, the value F=19 is encountered, we have to search to the left and to the right of F for all values between MIN and MAX. This is not really good. To speed up the search, we calculate BIGMIN (36 in the example) and LITMAX (15 in the example); at the low-side of F we search only for values MIN . . . LITMAX, at the high side of F we search only for values BIGMIN . . . MAX, thus skipping the hatched areas in FIG. 1b, and much of the search tree can be pruned. Z-Indexing is only efficient using this technique. Performing an efficient BIGMIN/LITMAX calculation is therefore a key problem to range searching.

Changing the [1] basic tree search algorithm slightly to comply with our Hilbert indexing requirements (dealing with points instead of indexes), range search with BIGMIN/LITMAX is briefly stated in pseudo code as follows: (Plo/Phi is the point in the rectangle with lowest/highest Hilbert value in the rectangle), H(P) is the Hilbert index of a point P):

Algorithm A:

```
calculate Plo, Phi
Range (P, Plo, Phi):
case 1: H(P)<H(Plo):
    Range (High Son of P, Plo, Phi).
case 2: H(P)>H(Phi):
    Range (Low Son of P, Plo, Phi).
case 3: H(Plo)<=H(P)<=H(Phi):
    report P if it lies in the query hyper rectangle
    Compute BIGMIN and LITMAX
    Range (Low Son of P, Plo, LITMAX)
    Range (High Son of P, BIGMIN, Phi)
```

BIGMIN range searching with B-type trees:

The modification of the algorithm for B-type trees (developed for external searching), where each node has more than one record, is obvious. It is shown by means of the following typical situations:

Situation 1): Nodes have up to 1 son per node record. A node P has records Ri with H-value H(Ri). A Record Ri has up to 1 son Si. Any H-value in the subtree of Ri is between H(Ri−1) and H(Ri). (This corresponds roughly to the definition of a B-tree, neglecting the an additional rightmost son in order to make the description more readable; B*-trees are essentially the same but with a different minimum filling degree).

Algorithm B1 is as follows:

```
calculate Plo, Phi
Range (P, Plo, Phi):
for each Ri in P do
{ Report Ri if it lies in the query hyper reclangle.
  if H(Plo)<H(Ri) and H(Phi)>H(Ri-1) then
{
```

-continued
```
    compute BIGMIN with H(Ri)
    Range(Si, BIGMIN, Phi)
  }
}
```

The application to B+ trees (data stored in the leaves; pointers provided to the subsequent leave) is along the same lines.

Situation 2): A node P has up to 2 subtrees. H-values in P are greater than any H-values in any nodes of the left subtree; H-values in P are smaller than any H-values in any nodes of the right subtree. The lowest H-value in P is called Hmin(P), the highest H-value in P is called Hmax(P).

Algorithm B2 is as follows:

```
calculate Plo, Phi
Range (P,Plo, Phi):
case 1: Hmax(P)<Plo:
    Range (High Son of P, Plo, Phi).
case 2: Hmin(P)>HMAX
    Range (Low Son of P, Plo, Phi).
case 3: Plo<=H-Value(P)<=Phi
    Report all records in P that lie in the query hyper rectangle.
    Compute BIGMIN with Hmax(P)
    Compute LITMIN with Hmin(P)
    Range (Low Son of P, Plo, LITMAX)
    Range (High Son of P, BIGMIN, Phi)
```

2: BIGMIN Solution for Z-Indexing

Now, the 1981 solution for Z-indexing [1] is recalled as much of its ideas can be applied to Hilbert indexing. The [1] approach is recalled because the basic concepts are easier seen with Z-coding; after that, the application to the more complicated Hilbert indexing will be described.

Figures 1B, 3:
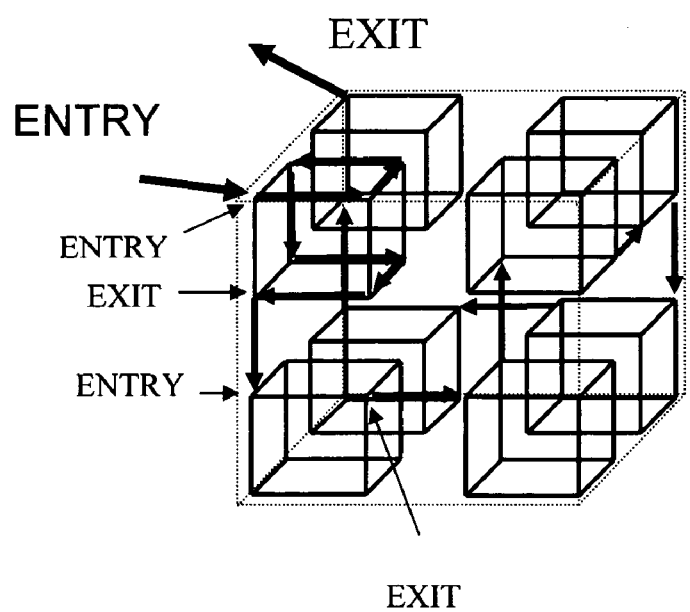
FIG. 1b explains efficient searching in Z-indexed data with values x=0 . . . 7, y=0 . . . 7.
FIG. 3 shows a 3D Hilbert Cube with 2 bit resolution.

Point F defines a staircase with Z-values lower than its Z-value on one side, the rest on the other side, depicted in FIG. 1b with a bold line. BIGMIN/LITMAX basically depends on how the (multidimensional) staircase cuts the search range.

The calculation of BIGMIN for Z-indexing is realized as a binary search with stepwise bisecting the data cube. Point F data (Z(F)) are bitwise scanned in interleaved order; at each step, the position of F and of the query rectangle is examined in relation to the bisecting line. The rectangle is given by its MIN/MAX Z-value corners. MIN,MAX data are also bitwise scanned.

F is given in brackets in the examples following; referring to the FIG. 1a Z-values, the x-coordinate is depicted vertically here, the y coordinate is depicted horizontally. The bisecting line is vertically oriented, which means that y is the actual dimension.

Six cases are possible when searching BIGMIN:

Case A: F is left of bisection line (Fbit=0).

Case A1: Range is totally left of bisection line (Fbit=0 MINbit=0 MAXbit=0) Example:

```
        18  24  26  |
        19  25  27  |
        22  28  30  |
           (21)
```

Everything is going on in the low section. Continue.

Case A2: Section Line crosses query range. (Fbit=0 MINbit=0 MAXbit=1) Search continues to the left; but two cases possible, but not yet distinguishable:

A2a: The staircase crosses the query region straight, exactly along the section line. Example:

```
   7  13  15  |  37  39
  18  24  26  |  48  50
  19  25  27  |  49  51
          (29)
```

If this is the case, BIGMIN is the lowest possible value in the high section (37). This value is calculated by simply loading 1000 . . . into MIN (7), called "candidate", starting form the actual bit position.

A2b: The staircase crosses the left query region in staircase form Example: (Here,

```
   7  13  15  |  37  39
  18  24  26  |  48  50
  19  25  27  |  49  51
  22  28  30  |  52  54
          (23)
```

BIGMIN is in the left section. The rectangle is shrinked. MAX jumps from 54 to 30. This jump is simply done by loading 0111 . . . into MAX, starting form the actual bit position.

Case A3: Range is totally right of bisection line (Fbit=0 MINbit=1 MAXbit=1). Example:

```
          (14)
          |  37  39
          |  48  50
          |  49  51
          (38)
```

MIN has become greater than Z(F). BIGMIN:=MIN. finish. Remark: This can happen due to shrinking the rectangle.

Case B: F is right of section line (Fbit=l)

Case B1: Range is totally left of bisection line (Fbit=1 MINbit=0 MAXbit=0). Example:

```
          (38)
   5   7  13  15  |
  16  18  24  26  |
  17  19  25  27  |
  20  22  28  30  |
```

MAX has become lower than Z(F) (this can happen due to shrinking the rectangle). BIGMIN must have been saved before. Report BIGMIN as saved. Finish.

Case B2: Range is totally right of bisection line (Fbit=1 MINbit=1 MAXbit=1) Example:

```
          |  48  50
          |  49  51
          |  52  54
          (53)
```

Everything is going on in the high section. Continue scanning.

Case B3: Section Line crosses query range. Fbit=1 MINbit=0 MAXbit=1

```
                (42)
          18  24  26  |  48  50
          19  25  27  |  49  51
          22  28  30  |  52  54
```

If this is the case, BIGMIN must be in the high section. Continue searching in the high section. The rectangle is shrinked. MIN jumps from 18 to 48. This value is calculated by loading 1000 . . . into MIN, starting from the actual bit position.

The LITMAX computation is analogous, with symmetries. The complete BIGMIN/LITMAX decision table can be found in [1]. Z-BIGMIN/LITMAX algorithm as recalled is linear with the number of dimensions and linear with the coordinate value's word length (supposed proper realisation of the LOAD function).

We will follow these guidelines for doing the same thing for Hilbert coded data.

3: Alternative Representation of Hilbert Indexing

The Hilbert curve is a space filling curve (each data point visited exactly once) with
- only single steps in exactly one dimension
- hierarchically bisecting the data cube.

Figure 2:
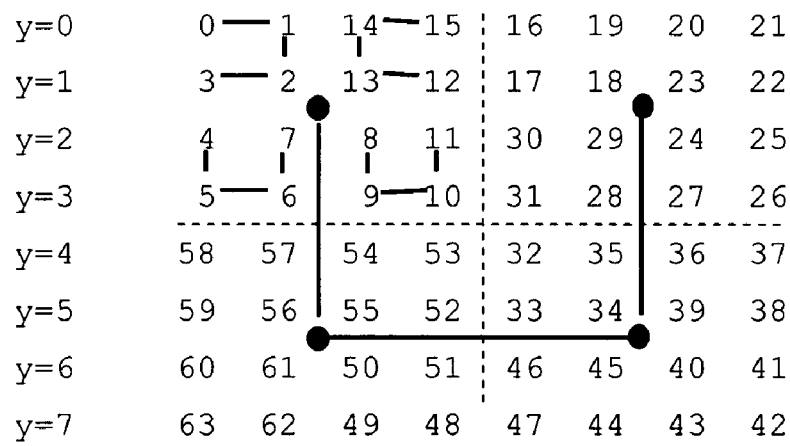
FIG. 2 shows an example of Hilbert indexing in 2D with values, x=0 . . . 7, y=0 . . . 7.

FIG. 2 shows by a 2D example how the Hilbert curve is recursively U-shaped, with the Us rotated at places.

In the following, we introduce an alternative view of Hilbert indexing that serves as basis for the algorithm described afterwards.

The method presented in the present application is based on this special representation of Hilbert indexing which is described here.

3D, 2 Bit Example

Let us first take a look on FIG. 3 for a 3D example with 2 bit resolution. We think the 3D, 2 bit resolution data cube as consisting of 8 subcubes with 1 bit resolution each. The Hilbert curve is a walk from one subcube to the next; the main bisection is between the front and the rear subcubes in the figure; in each side the subcubes are visited in a U-shaped manner. The subcubes themselves are visited internally in the same manner, mirrored and/or rotated the way as requested by their entry and exit position (in FIG. 3 only the internal curve of the first subcube is shown).

Gray Codes with Flip/Rot Representation

Turning to a bit oriented view, Hilbert indexing can be regarded as bit interleaved Gray Codes with special requirements on the Gray Codes used.

Figure 4:
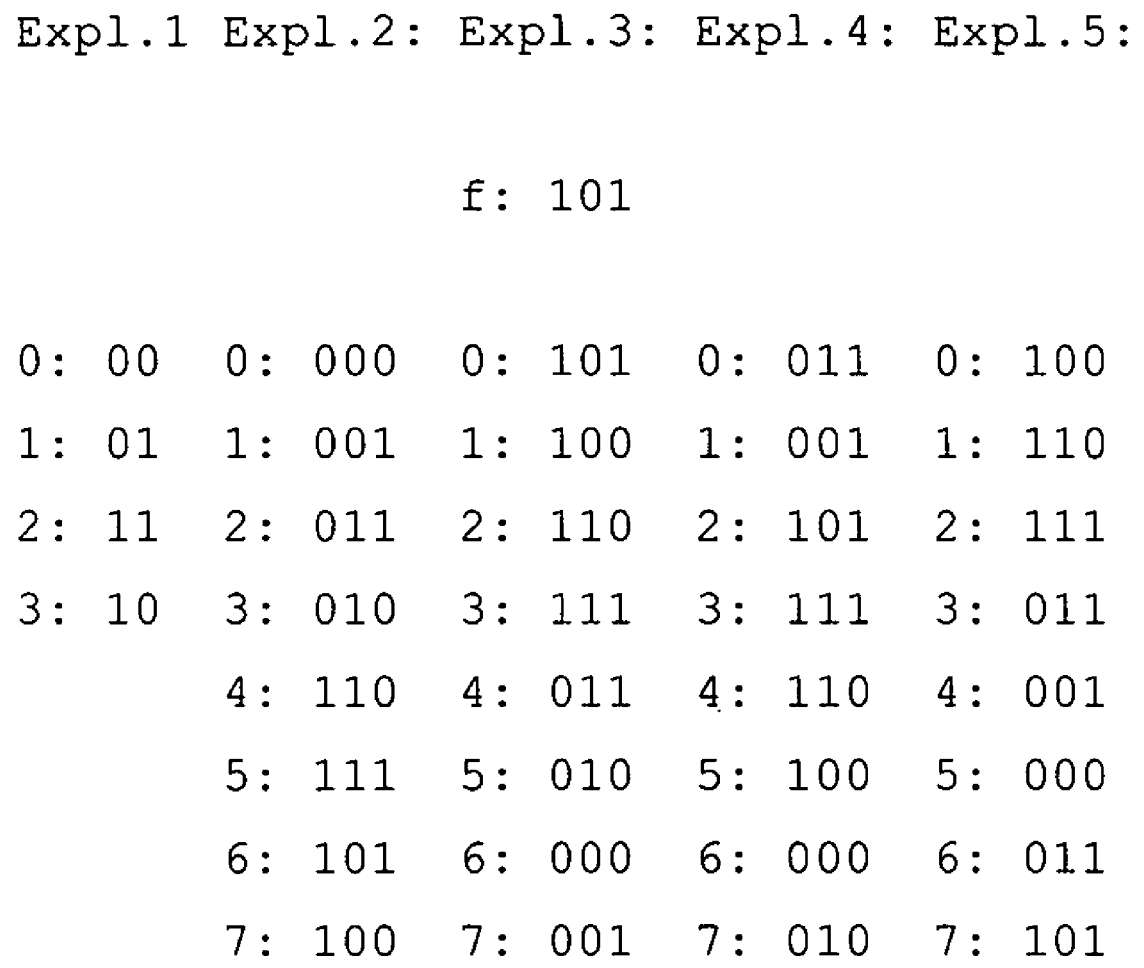

Gray coding means coding a sequence the way that at each step only one bit changes. For a cyclic Gray code, in addition, only 1 bit is different when comparing the first and the last code (FIG. 4, Example 1). A given cyclic Gray code can be doubled by adding one bit with first half and second half different, and mirroring the rest (Example 1--->Example 2).

Gray codes that allow a columnwise hierarchical decomposition of the indizes without considering wrap around are called G-code in the following (examples 1 .. 4, example 5 is a counterexample. In examples 2 and 3, the first decomposing bit is bit 1, second is bit 2, third is bit 3. In example 4 the first decomposing bit is bit 3, second is bit 1, third is bit 2). The classic example 1 or 2 code is called (standard) Gray code in the following.

A G-code remains a G-code if a column is inverted. A G-code remains a G-code if any columns are exchanged (with columns rotation as a special case). Inverting one or more columns is done by XORing the corresponding bits with 1. An array of bits indicating which column of a code to be XORed, is called Flip in the following. The procedure is called flipping. Flipping example 2 by 101 yields Example 3.

The problem discussed in this application is solved by only considering rotations, we need not think about exchanging. When handling rotations, we only think of the no. of columns it is rotated. We define left rotations positive (in the direction of more significant bits of standard Gray code). Rotating Example 3 by +1 yields example 4.

To describe the example 4 G-code, we simply write (101/+1) denoting that the standard Gray code has been flipped by 101 and then rotated by +1.

Flip/Rot Representation for Hilbert Cube

With Z-indexing, we strictly scan the data bitwise in interleaved order, beginning with the most significant bit, e.g. for three dimensions: xyzxyzxyz . . . . We can look at it bitblockwise: xyz xyz xyz . . . . ; this is what we do to cope with Hilbert indexing. Each bitblock represents a one bit (sub)cube with one bit resolution.

Note that the decimal numbers given at the left in FIG. 4 are the indices, the codes are, in binary interpretation, the bit interleaved geometric coordinates.

For Hilbert indexing the FIG. 3 cube, we take the Gray code for the main bitblock denoting the sequence of subcubes. For each of these code values, we have to find a G-code the way it complies with the Hilbert indexing requirements. This G-code describes the way the Hilbert curve takes within the subcube.

The Hilbert requirements are explained now with reference to FIG. 5, wherein transformation (lmn/r) means flip with lmn, rotate by r Tab(i)=(lmn/r) means that the transformation (table) for index i is (lmn/r). The three Hilbert requirements are:

(1) Main entry and main exit are main cube corners, so there the coordinate values are extreme, i.e. either 000 . . . or 111 . . . (x values are either 000 . . . or 111 . . . ; y values are either 000 . . . or 111 . . . ; etc.) Viewed bitblockwise that means that the bitblocks must be the identical (see positions (a)) in FIG. 5.

(2) When changing from subcube to subcube, exactly one coordinate changes by a single geometrical step. Therefore the changing subcube coordinate bit must do just the opposite thing of the main cube bit, see positions (b) in FIG. 5. So we have fixed one bit: exactly one bit must change at positions (b) in FIG. 5; it is the bit that is changing in the main cube and it toggles in the opposite way.

(3) For the remaining bits the following consideration holds: The codes need to be cyclic, therefore exactly one of the last row bit is required to be different to the corresponding first row bit (see arrow c in FIG. 5). Two cases are possible: If the bit already fixed happens to be different, the remaining bits must be copied from the first row. Otherwise we have free choice which of the remaining bits to make different (this is the reason why for more than 2 dimensions, the Hilbert curve is not unique).

Without loss of generality we assume that the first bitblock is a standard Gray code. A solution for the second bitblock column, under this assumption, is called a standard solution in the following. Once a standard solution for a given number of dimensions is known, i.e. the sequence of subcube coordinate transforms (mirroring and rotations) in the main cube, the solution for any deeper subcube can be calculated directly by a concatenation of flip/rot transforms. This is shown in FIG. 5 for subcube indexed with 6. The concatenation is surprisingly easy and can be be found in algorithm 1.

To make plausible that concatenation works: imagine for the moment that the 2nd bitblock code in question (Tab6) would be the standard Gray code instead of (110, 010, 011, 111 . . ). Then the 3rd bitblock G-code would be the Tab3-Standard G-code. Then imagine that both 2nd and 3rd bitblock G-codes are flipped and rotated by the Tab6 flip/rot to fit the 2nd bitblock with the first bitblock (parallel flipping/rotating does not change the relations between G-codes under consideration).

For simplicity of description assume first that for the given number of dimensions a standard solution flip table/rotation table is given; in the following algorithms we provide flip tables and rotation tables as constant arrays, for 2 or 3 dimensions. Later, we describe how flip and rot standard solution values are calculated "online" without the aid of precompiled tables (Calculating the standard solution).

Throughout the explanations the flip operation is followed by the rot operation. Of course, it can also be done the other way around: rotation followed by flip operation. To get the flip operation needed for this case, just rotate it. The first way is chosen because its expanation is more convenient.

Calculating the Hilbert Index

An algorithm that follows the above concepts is given as Algorithm 1.

Calculating the Hilbert index is not really needed for the BIGMIN problem discussed, but this algorithm serves as framework mechanism for the following algorithms to plug in specific blocks at places. Word length considerations are only critical when really calculating the Hilbert value.

Because the subject is intricate and much depends on fine details, the best thing to keep the description unique is providing complete source code instead of pseudo code, with semantics of the data as comments. The following algorithms are given in Pascal, with Shift and AND/OR/XOR operations allowed as in Borland Pascal. Throughout these algorithms, hi/lo refers to Hilbert index, right/left to coordinates. Local comments are given within the source code, general comments at the end of the source code.

Global declarations are as follows, (auxiliary functions and tables to be found in detail in the appendix):

Algorithm 1:

Type/Const/Variable Declarations:

```
(*constants to choose:*)
const ndims = 3; (*no. of dimensions*)
(*beware wordlength for calc_H; longint used here as max.
  wordlength.*)
const bitresolution= (sizeof(longint) * 8) div ndims;
const initialbit= bitresolution -1;
(*types to work with:*)
type point = array [1..ndims] of word;
type rectangle = record
        left, right: array [1..ndims] of word;
        (*left = low border, right= high border,
            viewed in point coordinates*)
        end; (*record*)
(*dependant:*)
type block     = array [1..ndims] of boolean;
const G_CodeLength = 1 shl ndims;
```

This is the function for calculating the n dimensional Hilbert index (algorithm 1):

```
function calc_H(p: point): longint;
(*calculates Hilbert index for point data*)
var bitpos:integer;d: integer;G_index: word;
flip: block; rot: integer; toggle: boolean;
data: block;indblck: block;
drot: array [1..ndims] of integer;inverted: boolean;mask: word;
result: longint; h:
integer;
begin
    result:=0; for h:=1 to ndims do flip[h]:=false; rot:=0;
    for bitpos:=initialbit downto 0 do
    begin
        mask:=1 shl bitpos;
        for d:=ndims downto 1 do
            (*this is the generate data block:*)
            data[d]:=(p[d] and mask)<>0;
            fliprot((*var*) data, flip, rot);
        toggle:=false;
    for d:=ndims downto 1 do
    begin
        (*only for other procedures:*)
        drot[d]:=mod_( (d-1 - rot), ndims) +1;
        inverted:= flip[drot[d]] XOR toggle;
        (*here optionally comes the working block*)
        indblck[d]:=data[d] XOR toggle; (*true if go hi*)
        toggle:=toggle XOR data[d]; (*toggle for hi data*)
        (*This is the update result block*)
        if indblck[d] then
            result:=result or (1 shl ((bitpos*ndims)+d-1) );
        calc_H:=result;
    end; (*for d*)
    g_index:=0;
    for d:=ndims downto 1 do
    if indblck[d]
    then g_index:=g_index or (1 shl (d-1));
    for d:=ndims downto 1 do
    if indblck[d] then g_index:=g_index or (1 shl (d-1));
    concat(flip, rot, fliptab[G_index],rottab[G_index],
            (*var*) flip, (*var*) rot);(*see appendix*)
    end; (*for bitpos*)
end; (*calc_H*)
```

Semantics of the calc_H Variables:

bitpos: integer running bit position within word length d: running. dimension for Gray converted data drot: from d back rotated index for original data access. drot[d] is where the flip for d was active G_index: Gray-code Index for next block Flip, rot: integer; running Hilbert index representation derived from old one and from G-index toggle: does Gray coding: going hi half, Gray codes mirror in the following, toggle inverts each time when going high half.

data: input data converted to Gray representation.

indblck: block; array of hi/lo decisions in d order.

inverted: boolean; tells if hi/lo inverted against right/left (if inverted, left/right means hi/lo, lo/hi otherwise)

mask: to fetch the bits at bitpos.

result: beware word length! Only needed if Hilbert index is really calculated, not nedded for further algorithms.

Inverted and drot are only needed for working blocks of further algorithms.

4: BIGMIN/LITMAX Solution for Hilbert Indexing

Now, the BIGMIN algorithm for Hilbert Indexing (shortly H-BIGMIN) is described in detail, based on the concepts introduced above (BIGMIN/LITMAX solution for Z-indexing, Hilbert indexing via fliprot, resp.). The H-LITMAX computation is along the same lines and needs not to be described separately. The description thus far relies on a table, precompiled once for a given number of dimensions;

What we need is two things:

(Problem 1) A function that tells which of two data points has the greater Hilbert value. This is needed for inserting, deleting and exact searching (the Hilbert value itself is not really needed), and (Problem 2) an efficient H-BIGMIN (and H-LITMAX) computation.

Comparing Data Points According to Hilbert Index
    Problem 1 is solved with
function greater(p, p1: point): boolean;
(*true if hilbert value of p>Hilbert value of p1*)

which is easily accomplished by the following replacements in the calc_h function:

```
(*this is the generate data block:*)
for d:=ndims downto 1 do
begin
    p_in_right[d] :=(p [d] and mask) <> 0;
    p1_in_right[d]:=(p1[d] and mask) <> 0;
end;
data:=p_in_right; fliprot((*var*) data, flip, rot);
(*This is the update result block:*)
if p_in_right[drot[d]]<>p1_in_right[drot[d]] then
begin
    greater:=p_in_right [drot[d]] XOR inverted; exit;
end;
greater:=false;
```

BIGMIN/LITMAX Algorithm for Hilbert Indexing

In order to solve problem 2, we first solve Problem 2a:—within a rectangle, find the coordinates with lowest Hilbert index. Based on its solution we develop a solution of the problem 2b, the BIGMIN probem:

Searching Rectangle Point with Minimum Index

The lowest index in a query rectangle is no more simply the low rectangle corner index (as is the case with Z-indexing). A rectangle is represented by its outer borderline coordinates (left and right for each dimension). The following algorithm calculates the coordinates of the point with lowest Hilbert value within a rectangle (problem 2a).

It is basically the bitwise scanning of algorithm 1, with a binary search cutting the rectangle at each step if it overlaps the bisecting dimension.

The auxiliary functions forcehigh and forcelow perform what the Load functions do with Z-indexing (Load 1000 . . . , Load 0111 . . . ), but they handle rectangle data instead of point data.

The procedure calc_lowest_Hpoint_in_rectangle needs a few additional local variables:
procedure calc_lowest_Hpoint_in_rectangle(r: rectangle; var H_point: point);
var (*declarations see calc_H; in addition:*)
in_right, in_left: bitblock; in_lo, in_hi: boolean;
data_in_right, data_in_left: bitblock;
The generate data block is:

```
for d:=ndims downto 1 do
begin
    in_right[d]:= (r.right [d] and mask) <> 0;
    in_left [d]:= (r.left [d] and mask) = 0;
end;
(*generate normalized data to Gray:*)
data_in_right:=in_right; fliprot((*var*) data_in_right, flip, rot);
data_in_left :=in_left; fliprot((*var*) data_in_left, flip, rot);
```

The working block is

```
if NOT inverted
    then begin
            data[d]:=data_in_right[d];
            if in_right[drot[d]] and in_left[drot[d]] then
                    forceri((*var*) r.left[drot[d]], bitpos);
        end
    else if in_right[drot[d]] and in_left[drot[d]]
        then begin
            data[d]:=not data_in_left[d];
            forcele((*var*) r. right[drot[d]], bitpos);
        end
    else if in_right[drot[d]] and (not in_left[drot[d]])
        then data[d]:=data_in_right[d]
        else if (not in_right[drot[d]]) and in_left[drot[d]]
            then data[d]:=not data_in_left[d]
            else error ('1');
```

The update result block is:

```
if indblck[d] XOR inverted (*convert bitset decision back*)
    then H_point[drot[d]]:=H_point[drot[d]] or mask;
```

BIGMIN Algorithm

The BIGMIN problem 2b is then solved as follows: The same basic idea as with Z-indexing described above, using the hilbert calculation mechanisms of the foregoing algorithms, but there is a serious complication: The candidate point becomes more difficult to calculate.

It is not good to calculate the candidate point immediately when a candidate must be saved: maybe it is not needed at all, maybe there will come better candidates while searching. If we would do the calculation immediately, the procedure would become quadratic with the number of dimensions.

We do now the following: When a candidate must be saved, we simply save it in form of the sub-rectangle in which it is the lowest/highest value. If it turns out that this candidate is the solution, it is still the right time to do the calculation. If a better candidate shows up, we simply overwrite the candidate's rectangle data. So in the end at most one candidate must be calculated, and the procedure becomes linear.

In the heart of the algorithm, again the 6 cases are distinguished as with Z-indexing explained above.

Here we give only one example; it is analogous to the above considerations described for Z-ordering.

F=18 is in Low section, rectangle overlaps sections (18)

| 0 | 3 | 4 | 5 | \| | 58 | 59 | 60 | 63 |
|---|---|---|---|---|---|---|---|---|
| 1 | 2 | 7 | 6 | \| | 57 | 56 | 61 | 62 |
| 14 | 13 | 8 | 9 | \| | 54 | 55 | 50 | 49 |
| 15 | (12 | 11 | 10 | \| | 53 | 52) | 51 | 48 |
| 16 | (17 | 30 | 31 | \| | 32 | 33) | 46 | 47 |
| 19 | 18 | 29 | 28 | \| | 35 | 34 | 45 | 44 |
| 20 | 23 | 24 | 27 | \| | 36 | 39 | 40 | 43 |
| 21 | 22 | 25 | 26 | \| | 37 | 38 | 41 | 42 |

BIGMIN is either in low section or the MIN of rectangle in hi section. Save candidate in high, cut hi section from rectangle, go lo section.

The BIGMIN Procedure:

```
procedure calc_BIGMIN(r: rectangle; F: point; var BIGMIN: point);
(*F is the point encountered in a search tree. precondition:
H-index of F is between highest/lowest H-indices in r, but
geometrically not in r*)
needs a few local variables in addition to
the procedure
calc_lowest_Hpoint_in_rectangle:
var F_in_right: bitblock; F_in_hi: boolean; cand: rectangle;
```

The generate data block is:

```
for d:=ndims downto 1 do
    begin in_right    [d]:= (r.right [d] and mask) <> 0;
        in_left       [d]:= (r_left [d] and mask) = 0;
        F_in_right[d]:= (F       [d] and mask) <> 0;
    end;
    data:=F_in_right; fliprot((*var*) data, flip, rot);
``` the working block, including result calculation is

```
if NOT inverted
    then begin F_in_hi:=F_in_right [drot[d]];
            in_hi    :=in_right     [drot[d]];
            in_lo    :=in_left      [drot[d]];
        end
    else begin F_in_hi:=not F_in_right [drot[d]];
            in_hi    :=in_left     [drot[d]];
            in_lo    :=in_right    [drot[d]];
        end;
    if F_in_hi then (*implies go hi*)
    begin
        if not in_hi then(*search fails; rep. Min in cand.*)
        begin
```

-continued

```
    calc_loHpoint_in_rect(cand, (*var*) BIGMIN); exit;
  end;
  if in_lo then
  if not inverted
  then forceri((*var*) r.left [drot[d]], bitpos)
  else forcele ((*var*) r.right[drot[d]], bitpos);
  end (*di_in_hi*)
  else
  begin (*di_in_lo*)
      if not in_lo then(*search fails;cand.is BIGMIN*)
      begin calc_loHpoint_in_rect(r, (*var*) BIGMIN);
          exit;
      end;
      if in_right[drot[d]] and in_left[drot[d]] then
      begin cand:=r; (*save candidate hi, cut lo, go lo:*)
          if not inverted then
          begin forcele((*var*) r.right [drot[d]], bitpos);
              forceri((*var*) cand.left [drot[d]], bitpos);
          end else
          begin forceri((*var*) r.left [drot[d]], bitpos);
              forcele((*var*) cand.right[drot[d]], bitpos);
          end;
      end;
  end; (*di_in_lo*)
```

The H-LITMAX computation is the same thing with inverted thinking.

Remarks:

A number of technical improvements are possible: When rotating the data, copying can be omitted by merely rotating working indices.

Another technical improvement is that the candidate calculation is only necessary to be done starting with the bit position at which the candidate has been created. To do this, the bitposition and the running flip/rot state have to be saved together with the candidate. BIGMIN and LITMAX can be calculated in parallel because F is the guiding point. We only need two candidates of course, one for BIGMIN and one for LITMAX, exit to candidate calculation to be coordinated with bookkeeping.

We did not present the algorithm with those technical improvements in order to make the description better understandable.

5: Calculating the Standard Solution

Now, we describe how this precompiling can be circumvented by replacing the table lookup by a function call that is free from iteration or recursion.

When precompiling, Lawder [7,8] uses state transition diagrams that are much more complicated than the data described here, derived from so-called generator tables. The FIG. 5 column 2 data are part of what Lawder calls a generator table. Lawder has observed that there is a system within this column. Influenced by his work at this point, we present a somewhat different view of the same sequence. Based on this view, we provide an algorithm for calculating the G-code representation just for a given index, without calculating the table column as a whole thing.

We start with a primitive cell FIG. 6(a) which is the representation of a 1D, 2-bit data cube conforming with the Hilbert indexing requirements. Going to 2D, at first the whole thing is mirrored and a 00 . . 0, 11 . . 1 sequence added (b) (as with Gray coding). Then, in order to comply with the Hilbert indexing requirements, we invert the outermost bits (">", "<") at the mirror point, see (c). The 3D standard solution is shown in (d).

The algorithmic solution for a given index i is as follows: Entry code and exit code are set to the gray code of index i. Apart from LSB bits, the Entry code bits are inverted at places where the binary representations of i−1 to i changes from 0 to 1. The exit code bits are inverted accordingly for a binary 0-1-change from i to i+1. If such a bit is inverted, then also its LSB is inverted. Then, flip is simply the entry code value and rot is the place where entry and exit bits differ. We do not give the source code because transformation to source code is easy.

Why it works:

the first bit combination is always 0000 . . .

the last bit combination is always 1000 . . .

mirroring does not change the conditions apart from the mirror point.

At the mirroring point, after mirroring, inverting the leftmost bit makes it comply with Hilbert requirement 2 (see above).

This, however, introduces an inversion to the foregoing bit which is compensated by undoing the inversion that always takes place at the rightmost bit of the mirror point, as it stems from the primitive element.

Note that there are many solutions that comply with the Hilbert indexing requirements (2D has one solution, 3D has 2 solutions and one dead end when doing exhaustive backtracking); we consider the solution presented here as being canonical as it is a minimal amendment do Gray coding.

To avoid precompiling the flip/rot table for a given dimension, just replace the fliptab/rottab table lookup in algorithm 1 by corresponding flipfunc/rotfunc function calls.

DISCUSSION, RELATED WORK

For experimental studies, performance is measured in terms of the number of nodes inspected. Test data are generated with a pseudo random generator for both the data in the database and the query data, both over the whole range of the data cube. First experimental data give a mean 10% improvement of Hilbert ordering over Z-ordering (single cases are possible where Hilbert ordering is even worse than Z-ordering). Our experiments are done with up to 10 dimensions.

Lawder uses either precompiled state transition diagrams, or he does a direct calculation that needs iteration. The method described here differs basically from the Lawder approach:

We do by means of a flip/rot representation and its very simple concatenation transform. We presented a fast nonitierative calculation by means of a simple concatenation of a flip/rot representation so that precompiling does not make much sense; if precompiling is done anyway, the flip/rot tables are much compacter than state diagrams. Calculation is done for a given index, without calculating the table column as a whole thing.

We use the [1] candidate technique; what Lawder does using explicit backtracking, is done here by simply saving a rectangle's data as candidate. Another thing may be worth to be mentioned: when bisecting the space, Lawder uses two limits explicitely: max_lower and min_higher. We show by our algorithm that these limits are not really needed.

As our flip/rot transformation is free from recursion or iteration, the whole BIGMIN/LITMAX algorithm becomes linear with the number of dimensions and linear with the coordinate's values word length; this is true although working bitwise, as in a technically optimized version rotations are done in one step by changing the working indices accordingly, without copying data.

Last not least we do not necessarily process the search tree left-right; starting at the root of the search tree and working recursively to both sides with both BIGMIN and LITMAX is more convenient as skipping subtrees is done in a natural way.

The Lawder approach has been presented for B-type trees searching for the page key of BIGMIN's bucket (the page key is the key with minimum index within the bucket). We strictly separate the search procedure from the BIGMIN calculation, thereby making considerations and adaption to alternative data handling systems easier; so it applies to any method of sorting one-dimensional data. For example, it can also be applied to skiplists. As an example, we have explicitely shown how the concept applies to both binary and B-type trees (Algorithms A and B).

We have presented the method in a modular way; our algorithm is generic in the sense that it is simple to be changed to alternative hierarchical indexing schemes by changing the fliprot and/or toggle and/or concat lines of frame algorithm 1 suitably (for Z-indexing just cancel the latter two lines).

As a side product, we have found a tiny algorithm for bitwise calculating the n-dimensional Hilbert index, which—in the opinion of the applicant—is much easier to understand than earlier work.

Technical Remarks:

We did not consider scaling. In real applications, scaling or mapping with a monotonic function should be done the way that the data cover the data cube nearly equally in all dimensions.

Both Z-indexing and Hilbert indexing apply also to negative and to real valued data. The only thing that is requested is that the bits are accessed in the order of significance (start with the exponent, MSB first, followed by the mantissa; invert sign bits).

For both Z-indexing and Hilbert indexing, bit interleaving is not done explicitly. We keep the data as usual and just scan the bits in interleaved order. Z-indices or Hilbert indices are not calculated explicitly, so there are no word length problems. BIGMIN and LITMAX values are working records represented just as normal records.

In a technically optimized version just some additions and XORs do per resolution bit. With the solution presented in this application it looks clear that for external storage the overhead against Z-indexing pays, because it virtually vanishes in relation to the time needed for disk accesses (question posed by [4] p. 190).

APPENDIX

AUXILIARY FUNCTIONS AND TABLES

```
function mod_(a: integer; modulo: integer): integer;
(*modulo correctly for neg. values*)
begin
    a:=a mod modulo; if a<0 then mod_:=a + modulo
                             else mod_:=a;
end; (*mod_*)
procedure rotateblock(var B: bitblock; r: integer);
(*rotates B by r*)
var hB: bitblock; h: integer;
begin
    hB:=B; (*copy: see text for technical improve-
    ments*)
    for h:=1 to ndims do B[h]:=
        hB[mod_(h-1-r,ndims)+1];
        (*shift right is fetch left*)
    end; (*rotateblock*)
    procedure fliprot(var B: bitblock; flip: bitblock; rot: integer);
```

APPENDIX-continued

AUXILIARY FUNCTIONS AND TABLES

```
    (*flips B with flip and then rotates by r*)
    var h: integer;
    begin
        for h:=1 to ndims do B[h]:=B[h] XOR flip[h];
        rotateblock((*var*) B, rot);
end; (*fliprot*)
(*Example tables precompiled once for a given
no. of dimensions, ndims = 2,
3: function replacement see text*)
(*2D:*)
const fliptab: array [0..G_CodeLength-1] of
        bitblock =((false,false), (false,false),
                   (false,false), (true ,true ));
const rottab: array [0..G_CodeLength-1] of integer =(1, 0, 0,1);
(*or, 3D:*)
const fliptab: array [0..1 shl ndims-1] of bitblock =
    ((false,false,false),(false,false,false),
    (false,false,false),(true ,true, false),
    (true ,true, false),(false,true ,true),
    (false,true ,true ),(true ,false,true ));
const rottab: array [0..1 shl ndims-1] of integer =
    (+2, +1, +1, 0,
        0, +1, +1, +2);
procedure concat_fliprot(f1: bitblock; r1: integer;
        f2: bitblock; r2: integer;
        var f: bitblock; var r: integer
        );
(*concat flip/rot transforms f1/r1 and f2/r2 to single transform f/r:*)
(*f2 shifted back by r1, then f1 XOR f2. r=r1+r2. Result
f order dependent!*)
var h: integer;
begin
    rotateblock((*var*)f2, -r1);
    for h:=1 to ndims do f[h]:=f2[h] XOR f1[h];
    r:= mod_(r1+r2, ndims);
end; (*concat_fliprot*)
procedure forceri(var b: word; bitpos: integer);
(*"force right": forces highest possible value into b,
    beginning with bitposition bitpos; bitpos = 0...*)
var mask: word;
begin
    if bitpos>(sizeof(mask)*8-1)then error('word length');
    mask:=1 shl bitpos;
    (*force 1 into actual bitposition, e.g. .OR 001000..*)
    (*force 0 into the rest,         e.g. .AND111000..*)
    b:= b OR ( mask );
    b:= b AND (NOT (mask-1));
end; (*forceri*)
procedure forcele(var b: word; bitpos: integer);
(*"force left": forces lowest possible value into b,
beginning with bitposition bitpos; bitpos =0...*)
var mask: word;
begin
    if bitpos>(sizeof(mask)*8-1 )then error('wordlength');
    mask:=1 shl bitpos;
    (*force 0 into actual bitposition, e.g. AND110111..*)
    (*force 1 into the rest,         e.g. .. OR000111..*)
    b := b AND (NOT mask );
    b := b OR ( (mask-1));
end; (*forcele*)
```

I claim:

1. A database system and a processor for organizing data elements according to a Hilbert curve, said data elements being representable by a plurality of coordinates, said database system comprising:

first means for generating a plurality of bitblocks by bitwise interleaving the coordinates of the data elements;

second means for applying a fliprot transformation to a first bitblock;

said fliprot transformation comprising a flip transformation and a rotation transformation, said flip transformation inverting bits of said first bitblock, said rotation transformation interchanging bits of said first bitblock;

wherein said rotation transformation of said first bitblock and said rotation transformation of each further bitblock cyclically shifts the bits of each respective bitblock;

third means for obtaining, for said each further bitblock, a fliprot transformation by a concatenation of two or more fliprot transformations;

fourth means for applying fliprot transformations to each further corresponding bitblock;

fifth means for accessing said data elements;

whereby the bits of said each respective bitblock determine the organization of said data elements according to said Hilbert curve.

2. A method of organizing data elements of a database according to a Hilbert curve, said data elements being representable by a plurality of coordinates, said method comprising the following steps:

generating a plurality of bitbiocks by bitwise interleaving the coordinates of the data elements;

applying a predetermined fliprot transformation to a first bitblock;

said fliprot transformation comprising a flip transformation and a rotation transformation, said flip transformation inverting bits of said first bitblock, said rotation transformation interchanging bits of said first bitblock;

wherein said rotation transformation of said first bitblock and said rotation transformation of each further bitblock cyclically shifts the bits of each respective bitblock;

for said each further bitblock, obtaining a fliprot transformation by a concatenation of two or more fliprot transformations;

applying fliprot transformations to each further corresponding bitblock;

accessing said data elements;

whereby the bits of said each respective bitblock determine the organization of said data elements according to said Hilbert curve.

3. A computer-readable data storage medium for storing program code for executing, when being loaded into a computer, the following steps:

generating a plurality of bitblocks by bitwise interleaving the coordinates of the data elements;

applying a predetermined fliprot transformation to a first bitblock;

said fliprot transformation comprising a flip transformation and a rotation transformation, said flip transformation inverting bits of said first bitblock, said rotation transformation interchanging bits of said first bitblock;

wherein said rotation transformation of said first bitblock and said rotation transformation of each further bitblock cyclically shifts the bits of each respective bitblock;

for said each further bitblock, obtaining a fliprot transformation by a concatenation of two or more fliprot transformations;

applying fliprot transformations to each further corresponding bitblock;

accessing said data elements;

whereby the bits of said each respective bitblock determine the organization of said data elements according to said Hilbert curve.

4. The method of claim 2, wherein organizing is a means for at least one of searching, sorting, storing, retrieving, inserting, deleting, querying, or range querying data elements in said database system.

5. The method of claim 2 for range querying data elements in said database, with a BIGMIN calculation including a candidate calculation wherein said candidate is kept in form of rectangle data.

6. The database system of claim 1, wherein the fifth means for accessing said data elements includes means for loading said data elements into RAM to be used by a local application.

7. The database system of claim 1, wherein the fifth means for accessing said data elements includes means for providing said data elements to an output device.

8. The database system of claim 7, wherein the fifth means for accessing said data elements includes means for providing said data elements to at least one of a display device and a printing device.

9. The database system of claim 1, wherein the fifth means for accessing said data elements includes means for at least one of reading, writing, and modifying said data elements.

10. The database system of claim 1, wherein the fifth means for accessing said data elements includes means for copying said data elements to a memory device.

11. The method of claim 2, wherein accessing said data elements includes loading said data elements into RAM to be used by a local application.

12. The method of claim 2, wherein accessing said data elements includes providing said data elements to an output device.

13. The method of claim 12, wherein accessing said data elements includes providing said data elements to at least one of a display device and a printing device.

14. The method of claim 2, wherein accessing said data elements includes at least one of reading, writing, and modifying said data elements.

15. The method of claim 2, wherein accessing said data elements includes copying said data elements to a memory device.

16. The database system of claim 1, wherein inverting bits of said first bitblock includes inverting values of the bits of said first bitblock.

17. The database system of claim 1, wherein interchanging bits of said first bitblock includes performing a one-dimensional shift of the bits of said first bitblock.

18. The method of claim 2, wherein inverting bits of said first bitblock includes inverting values of the bits of said first bitblock.

19. The method of claim 2, wherein interchanging bits of said first bitblock includes performing a one-dimensional shift of the bits of said first bitblock.

* * * * *